United States Patent
Haltiner, Jr. et al.

(10) Patent No.: US 7,718,295 B2
(45) Date of Patent: May 18, 2010

(54) METHOD FOR PREPARING AN INTERCONNECT

(75) Inventors: Karl J. Haltiner, Jr., Fairport, NY (US); Subhasish Mukerjee, Pittsford, NY (US)

(73) Assignee: Delphi Technologies, Inc., Troy, MI (US)

( * ) Notice: Subject to any disclaimer, the term of this patent is extended or adjusted under 35 U.S.C. 154(b) by 906 days.

(21) Appl. No.: 11/237,333

(22) Filed: Sep. 28, 2005

(65) Prior Publication Data
US 2007/0248867 A1 Oct. 25, 2007

Related U.S. Application Data

(63) Continuation-in-part of application No. 09/847,605, filed on May 1, 2001, now abandoned.

(60) Provisional application No. 60/201,569, filed on May 1, 2000.

(51) Int. Cl.
*H01M 2/00* (2006.01)
*H01B 13/00* (2006.01)

(52) U.S. Cl. .............................. 429/34; 429/38; 216/17
(58) Field of Classification Search .................. 429/34, 429/38, 39; 427/115; 216/17, 13, 18
See application file for complete search history.

(56) References Cited

U.S. PATENT DOCUMENTS

| | | | | |
|---|---|---|---|---|
| 5,256,499 A | * | 10/1993 | Minh et al. | 429/33 |
| 6,280,868 B1 | * | 8/2001 | Badwal et al. | 429/34 |
| 6,361,892 B1 | * | 3/2002 | Ruhl et al. | 429/30 |

\* cited by examiner

*Primary Examiner*—Raymond Alejandro
(74) *Attorney, Agent, or Firm*—Thomas N. Twomey

(57) ABSTRACT

A method for preparing an interconnect is provided. The method comprises: providing a conductive base sheet including a first face and a second face, the first and second faces are disposed on opposite sides of the base sheet; preparing anode gas flow passages on the first face of the conductive base sheet; preparing cathode gas flow passages on the second face of the conductive base sheet; and selecting anode gas flow passage geometry having a first geometric configuration; and selecting cathode gas flow passage geometry having a second geometric configuration that is different from the first geometric configuration so as to optimize fuel and oxidant gas flow according to system requirements.

25 Claims, 10 Drawing Sheets

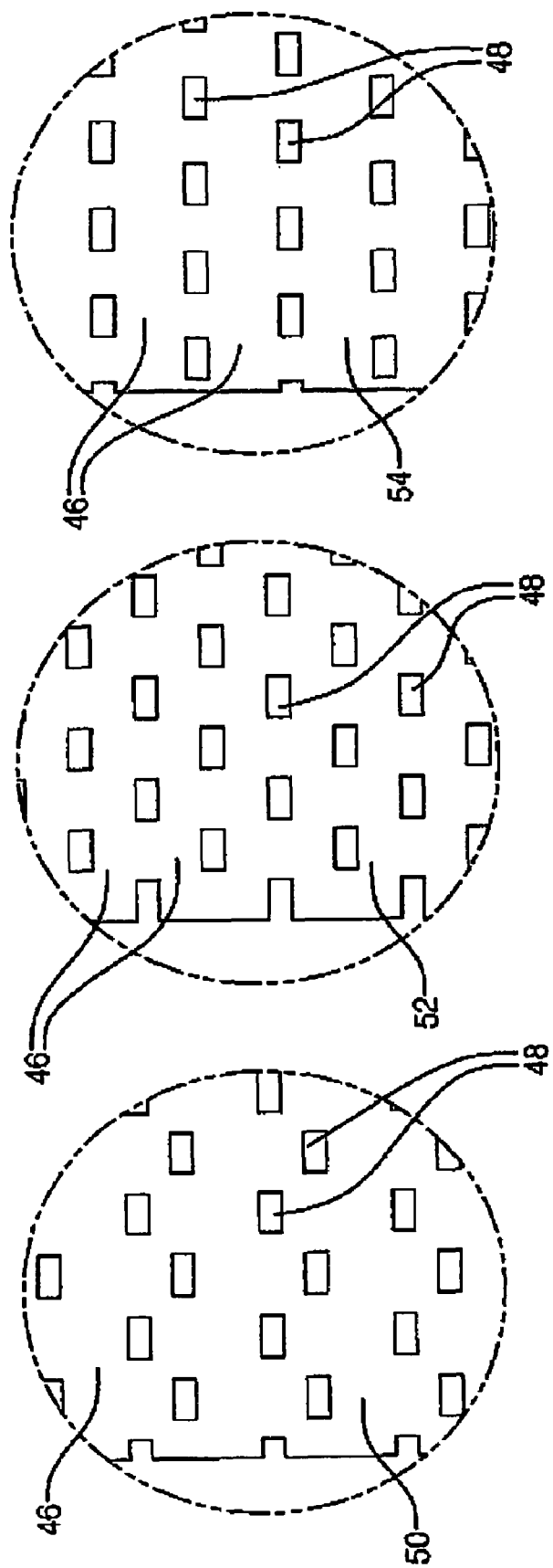

METHOD FOR PREPARING AN INTERCONNECT

CROSS-REFERENCE TO RELATED APPLICATIONS

The present application claims priority to U.S. Provisional Application Ser. No. 60/201,569 entitled "Etched Interconnect for Fuel Cell Elements," which is hereby incorporated by reference herein in its entirety.

The present application is a continuation-in-part of U.S. application Ser. No. 09/847,605, filed May 1, 2001, now abandoned, which claims priority to U.S. Provisional Application Ser. No. 60/201,569 entitled "Etched Interconnect for Fuel Cell Elements," which is hereby incorporated by reference herein in its entirety.

TECHNICAL FIELD

The present invention relates to fuel cells and is particularly related to etched interconnect devices for planar solid oxide fuel cells and with a method for preparing such interconnect devices.

BACKGROUND OF THE INVENTION

Fuel cells are electrochemical devices that convert chemical potential energy into usable electricity and heat without combustion as an intermediate step. Fuel cells are similar to batteries in that both produce a DC current by using an electrochemical process. Two electrodes, an anode and a cathode, are separated by an electrolyte. Like batteries, fuel cells are combined into groups, called stacks, to obtain a usable voltage and power output. Unlike batteries, however, fuel cells do not release energy stored in the cell, running down when battery energy is gone. Instead, they convert the energy typically in a hydrogen-rich fuel directly into electricity and operate as long as they are supplied with fuel and oxidant. Fuel cells emit almost none of the sulfur and nitrogen compounds released by conventional combustion of gasoline or diesel fuel, and can utilize a wide variety of fuels including natural gas, coal-derived gas, landfill gas, biogas, alcohols, gasoline, and diesel fuel oil.

Several types of fuel cells are under development. Among these, the solid oxide fuel cell (SOFC) is regarded as the most efficient and versatile power generation system, particularly for dispersed power generation, providing low pollution, high efficiency, high power density and fuel flexibility. In transportation applications, SOFC power generation systems are expected to provide a higher level of efficiency than conventional power generators which employ heat engines such as gas turbines and diesel engines that are subject to Carnot cycle efficiency limits. Therefore, use of SOFC systems as power generators in vehicle applications is expected to contribute to efficient utilization of resources and to a relative decrease in the level of $CO_2$ emissions and an extremely low level of $NO_x$ emissions. SOFC systems designed to address specific concerns and requirements of operation in a vehicle are under development including SOFC systems designed to serve as an auxiliary on-board power unit rather than as the prime energy source of the vehicle.

As with fuel cells generally, very hot solid oxide fuel cells (SOFC) having high electrical conductivity, are used to convert chemical potential energy in reactant gases into electrical energy. In the SOFC, two porous electrodes (anode and cathode) are bonded to an oxide ceramic electrolyte (typically, yttria stabilized zirconia, $ZrO_2$—$Y_2O_3$) disposed between them to form a selectively ionic permeable barrier. Molecular reactants cannot pass through the barrier, but oxygen ions ($O^{2-}$) diffuse through the solid oxide lattice. The electrodes are typically formed of electrically conductive metallic or semiconducting ceramic powders, plates or sheets that are porous to fuel and oxygen molecules. Manifolds are employed to supply fuel (typically hydrogen, carbon monoxide, or simple hydrocarbon) to the anode and oxygen-containing gas to the cathode. The fuel at the anode catalyst/electrolyte interface forms cations that react with oxygen ions diffusing through the solid oxide electrolyte to the anode. The oxygen-containing gas (typically air) supplied to the cathode layer converts oxygen molecules into oxygen ions at the cathode/electrolyte interface. The oxygen ions formed at the cathode diffuse, combining with the cations to generate a usable electric current and a reaction product that must be removed from the cell (i.e., fuel cell waste stream) or recycled such as with a waste energy recovery device.

Individual fuel cells are stacked anode to cathode, to provide a fuel cell stack providing the desired output voltage. Conductive, typically metal, plates referred to as interconnects are interleaved between each fuel cell, as well as at each end of a fuel cell stack and at each side of a single fuel cell. One function of the interconnect is to convey electrical current away from the fuel cell and/or between adjacent fuel cells and heat away from the fuel cell or cells. The interconnect, therefore, should have a relatively high electrical conductivity to minimize voltage losses, with negligible contact resistance at the interconnect-electrode interface. The interconnect should further have a relatively high thermal conductivity to provide uniformity of heat distribution and to reduce thermal stresses. A thermal conductivity above about 25 W/m K, for example, is desirable. Since an intermediate interconnect in a fuel cell stack extends between the anode of one fuel cell and the cathode of the adjacent fuel cell, the interconnect must be impervious to gases in order to avoid mixing of the fuel and oxidant. Thus, the interconnect should have a relatively high density with no open porosity, as well as stability in both oxidizing and reducing environments at the operating temperature. The interconnect should further have high creep resistance so that there is negligible creep at the operating temperature and a low vapor pressure. The interconnect should further exhibit phase stability during thermal cycling, have a low thermal expansion mismatch between cell components, and have chemical stability with respect to components with which it is in contact. The interconnect should possess sufficient strength to provide structural support to the relatively fragile fuel cells. In addition, the interconnect should preferably be low cost, easily fabricated, and have low brittleness.

A second function of the interconnect is to provide gas flow passages on the top and bottom surfaces while maintaining good electrical contact to the fuel cell. The gas flow passages are preferably configured to minimize flow pressure drop of the gas streams while promoting swirl or mixing for good fuel utilization (anode) and heat transfer (cathode). The gas flow passages are connected to supply and return manifolds which can be discrete devices or integral to the interconnects and fuel cells.

Ceramic, cermet and alloy interconnects are known in the art. Metallic materials have the advantages generally of high electrical and thermal conductivity and ease of fabrication. However, stability in a fuel cell environment comprising high temperatures in both reducing and oxidizing atmospheres, limits the number of available metals that can be used in interconnects. Most high temperature oxidation resistant alloys have some kind of built-in protection mechanism, typically forming oxidation resistant surface layers. Fabrication of such interconnects is complex and may comprise, for example, providing three sheet metal sheets having appropriate gas flow channels formed therein and combining the sheets, such as by brazing, to form an interconnect assembly having anode gas (fuel) channels on one side, cathode gas (oxidant, typically air) channels on the opposite side, and integral anode gas supply channels. A support for the ceramic fuel cell is provided on the anode side, such as a sheet of nickel foam, which foam support provides flow passages for the anode gas and electrical connection from the cell to the interconnect. The anode gas supply channels must be sealed from one interconnect to the next, such as with a non-conducting gasket.

What is needed in the art is a simplified, lower cost, high efficiency interconnect for fuel cell elements.

SUMMARY OF THE INVENTION

An etched interconnect for fuel cell elements comprising solid oxide electrolyte, an anode, and a cathode, includes a single conductive base sheet having first and second major faces on opposite sides of the base sheet, anode gas flow passages disposed on the first face of the base sheet and cathode gas flow passages disposed on the second face of the base sheet. The anode gas flow passages and cathode gas flow passages have a geometry selected to optimize fuel and oxidant gas flow according to system requirements.

In a preferred embodiment, the anode gas flow passages comprise a large quantity of small diameter, closely spaced contact points. In another preferred embodiment, the cathode gas flow passages are configured to provide deep flow passages to promote oxidant mixing and a large surface area for optimum heat transfer to the cathode gas stream.

A method for preparing the etched interconnect includes preparing anode gas passages and cathode gas passages on first and second faces, respectively, of the single conductive base sheet, selecting the geometry of the anode and cathode gas flow passages so as to optimize fuel and oxidant gas flow according to system requirements. Preparing may comprise any means sufficient to cut the desired gas passage geometry into the base sheet. In a preferred embodiment, the gas flow passages are prepared using a photochemical etching process.

Advantageously, the present etched interconnect is thinner and structurally stiffer than prior comparable interconnect devices. The present method further enables fine, intricately etched gas passage configurations providing optimum flow characteristics. The simplified interconnect provides ease of manufacture and therefore lower cost compared to previous devices. In addition, the closely spaced un-etched contact points that contact the ceramic fuel cell surface provide structural support to the cell to prevent fracture of the ceramic cell.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

Figure 10:
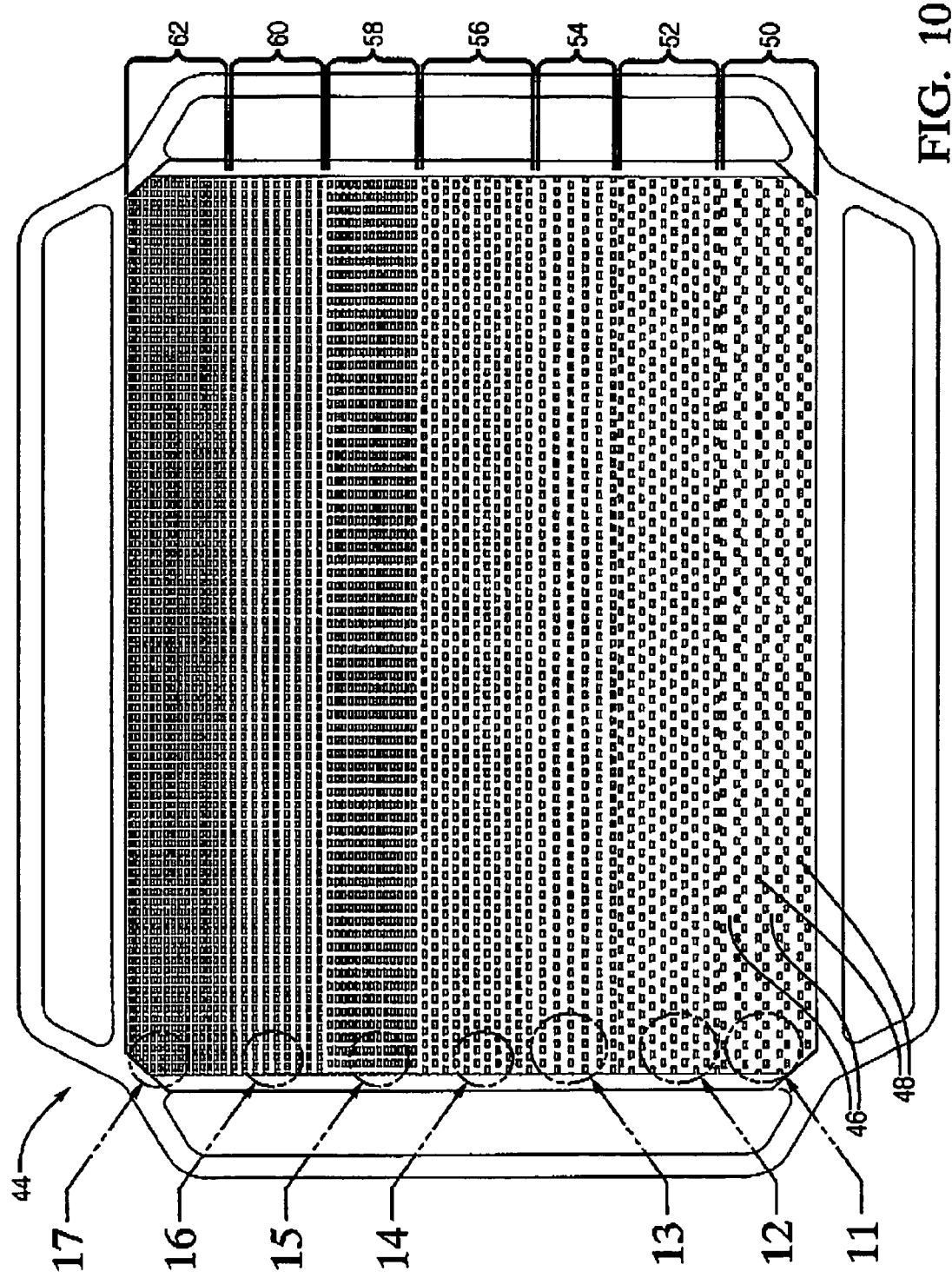
FIG. 10 is a perspective view of yet another embodiment of an interconnect in accordance with the invention.

FIG: 11 is an enlarged view of a portion of a first section of FIG. 10.

FIG. 12 is an enlarged view of a portion of a second section of FIG. 10.

FIG. 13 is an enlarged view of a portion of a third section of FIG. 10.

Figure 14:
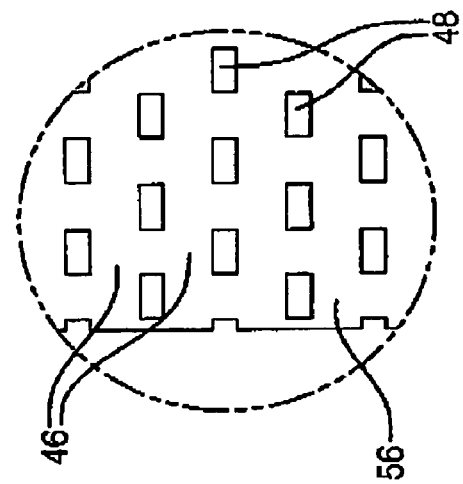

FIG. 14 is an enlarged view of a portion of a fourth section of FIG. 10.

Figure 15:
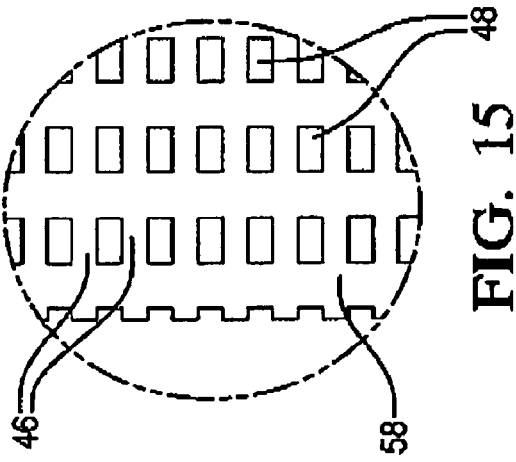

FIG. 15 is an enlarged view of a portion of a fifth section of FIG. 10.

Figure 16:
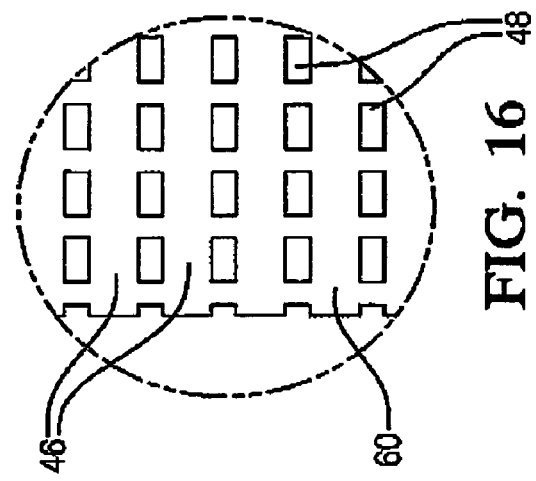

FIG. 16 is an enlarged view of a portion of a sixth section of FIG. 10.

Figure 17:
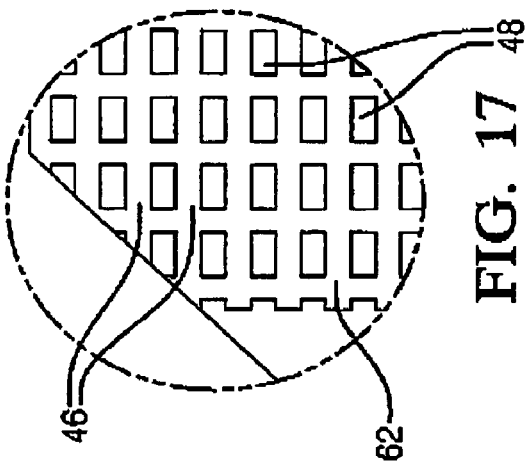

FIG. 17 is an enlarged view of a portion of a seventh section of FIG. 10.

Figure 18:
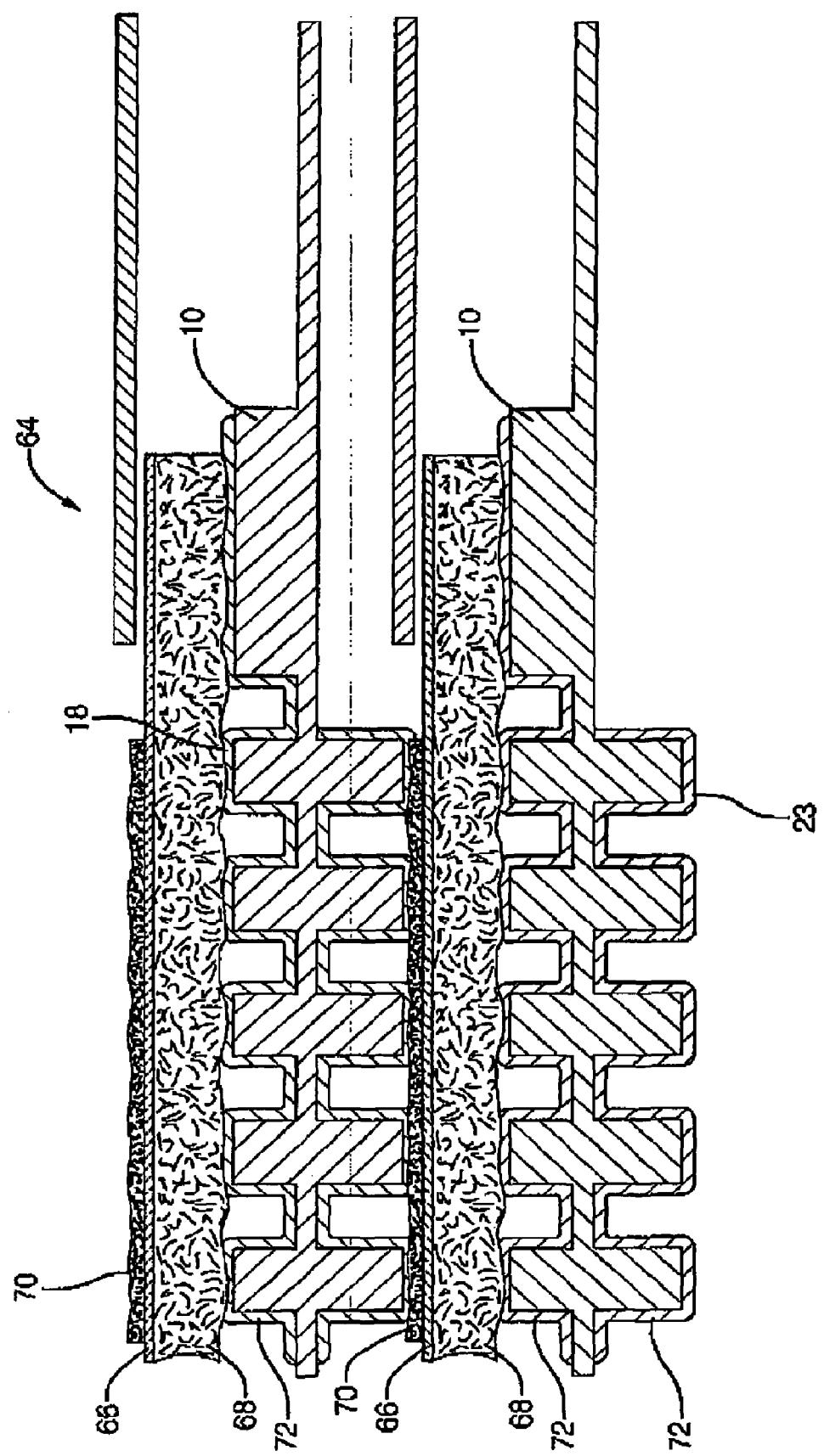

FIG 18 is a schematic view of a portion of a fuel cell stack showing an interconnect having a yielding layer in accordance with the invention.

DESCRIPTION OF THE PREFERRED EMBODIMENT

Figure 1:
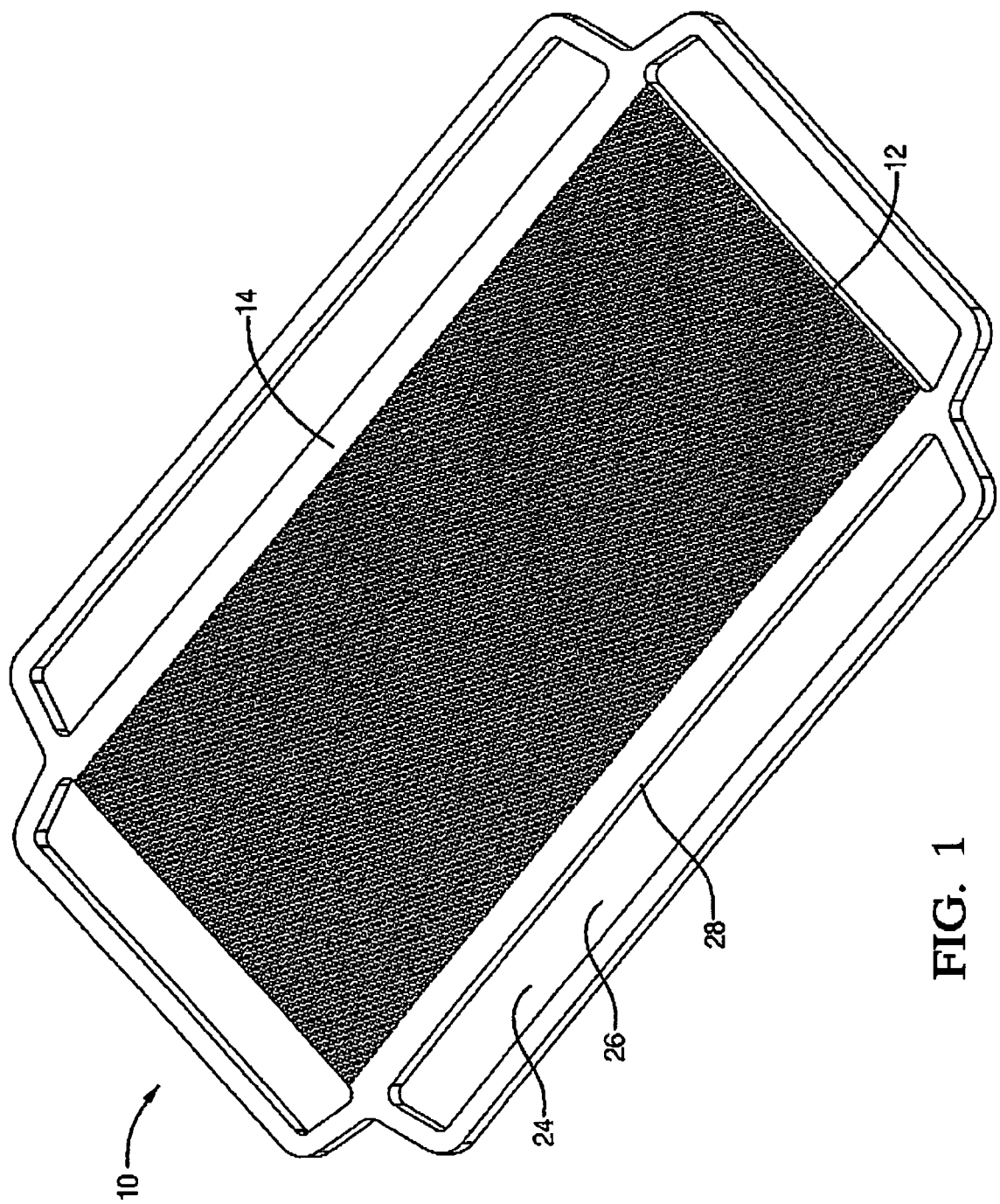
FIG. 1 is a perspective view of an anode side of an etched interconnect in accordance with one possible embodiment of the present invention.

Turning to FIG. 1, the anode side of an etched interconnect 10 in accordance with one possible embodiment of the present invention is shown. The etched fuel cell interconnect 10 includes a base sheet comprising a single piece of sheet metal 12 having anode and cathode gas flow passages disposed on opposite sides thereon. The first face 14 of the base metal sheet 12 has anode gas flow passages 16 and standing surfaces 18. A second face 20 has cathode gas flow passages 22 and standing surfaces 23 (cathode side shown in FIGS. 3 and 4).

The base metal sheet 12 may comprise any material having sufficient conductivity and strength characteristics. Preferably, the base metal sheet 12 is selected to match the thermal expansion co-efficient of the fuel cell element. Examples of materials suitable for the base metal sheet 12 include, but are not limited to, stainless steel, high temperature alloys, nickel alloys, and combinations thereof.

One aspect of the present invention comprises preparing anode gas flow passages on a first face of the conductive base sheet and preparing cathode gas flow passages on the second face, selecting the gas flow passage geometry on each face so as to optimize fuel and oxidant gas flow in accordance with the particular system requirements. Any suitable process may be employed to prepare the etched interconnect providing that the selected process enables disposition of different geometric configurations on the anode and cathode faces of the interconnect. For example, flow passage depth and pattern intricacy may be selected for each side, anode and cathode, providing optimum flow channel geometry for the different flow requirements. Even after processing, the overall interconnect geometry remains flat, stiff, and of a substantially uniform thickness, providing enhanced structural support to the fuel cell (not shown). Suitable processes include, but are not limited to, etching processes such as photochemical and electrochemical etching, and cutting, such as with a laser or other suitable device, among others.

In one preferred aspect of the present invention, the interconnect 10 is prepared using a photochemical metal machining process. Such processes comprise generally coating the subject to be machined with photosensitive material (photoresist), registering a mask on the coated subject, typically on both sides, and exposing and developing the photoresist. The process further comprises etching the metal subject by exposing to acid, the exposed photoresist protecting the areas on the subject that are to remain un-etched. After etching, the remaining photoresist is removed, leaving the etched passages and un-etched points that were protected by the photoresist. One feature of this process is that different patterns can be etched on the two sides of the subject plate, and that each side can be etched to a different depth depending on the pressure of the acid jets and their placement.

Figure 2:
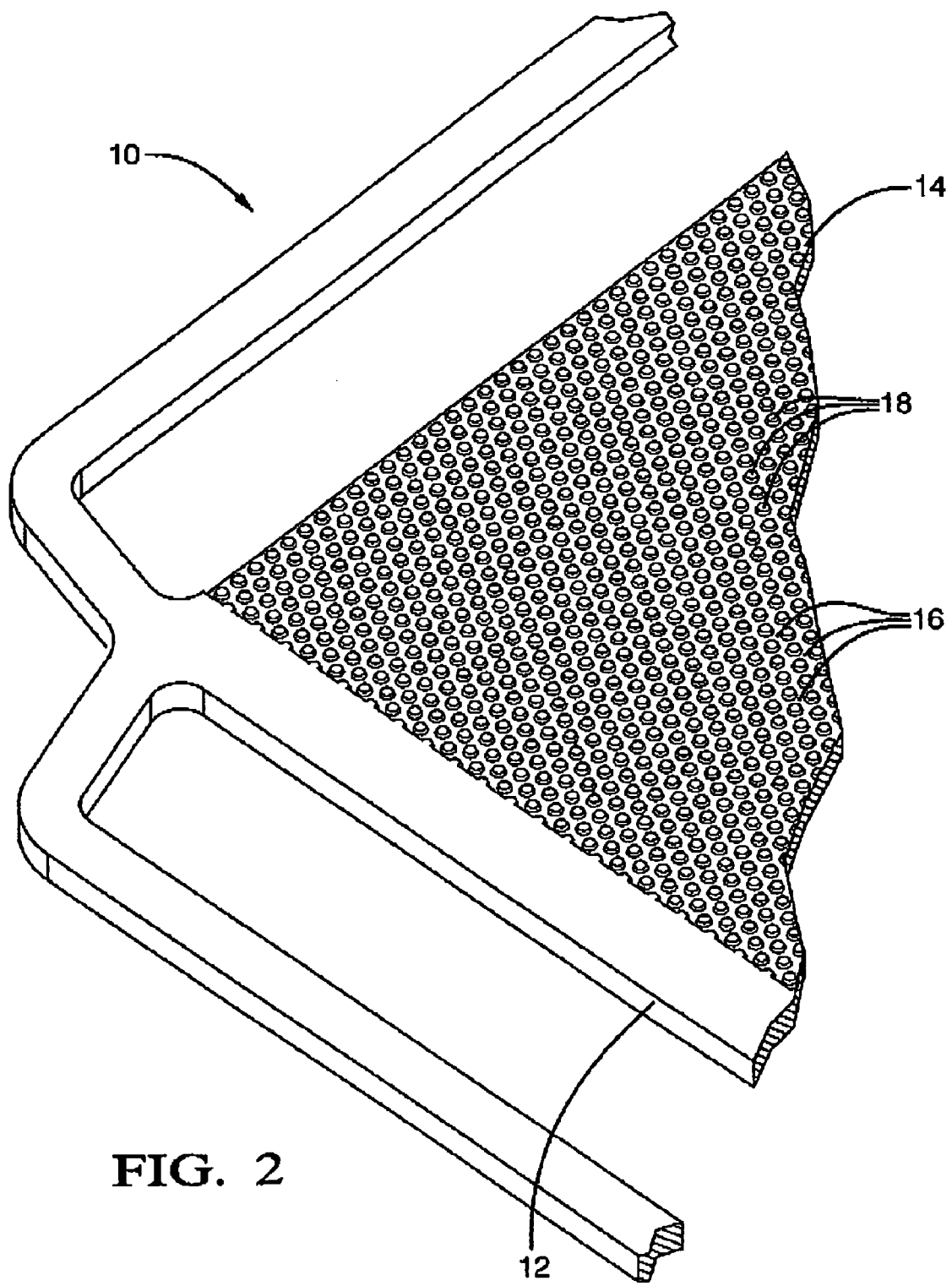
FIG. 2 is a view showing further detail of a portion of the etched interconnect of FIG. 1.

FIG. 2 provides a close-up view of a portion of the anode side of the etched fuel cell interconnect 10 shown in FIG. 1. The standing (that is, un-etched) surfaces 18 have flat faces which provide good electrical contact to the fuel cell. Large portions of the standing surfaces 18 are co-planar thus providing good mechanical support to the fuel cell element.

FIGS. 1 and 2 provide a highly simplified schematic view of the etched anode gas flow passages 16. The geometry of the gas flow passages can be extremely detailed with fine features for optimizing anode gas flow, or features that vary across the interconnect to compensate for fuel gas concentration changes and temperature changes of the anode gas as it flows across the fuel cell.

In a preferred embodiment, the anode gas flow passages 16 and cathode gas flow. passages 22 (best shown in FIG. 4) are each configured wit a distinct pattern and depth selected to optimize fuel and oxidant gas flow according to the particular system requirements. In a most preferred embodiment, the anode face 14 comprises a large quantity of small diameter, closely spaced contact points 18. For example, in one embodiment of the present invention, the contact points may be present on the anode face 14 at a density of about 10 to about 25 contact points per square centimeter. In another example, the contact points maybe generally round in shape and have a diameter of about 0.5 to about 1 millimeter. This anode side un-etched geometry provides good electrical contact to the fuel cell, provides flow passages allowing high swirl for optimum mixing of the fuel gas in combination with low pressure drop, and further provides a stiff, uniform support surface for the fuel cell.

Figure 3:
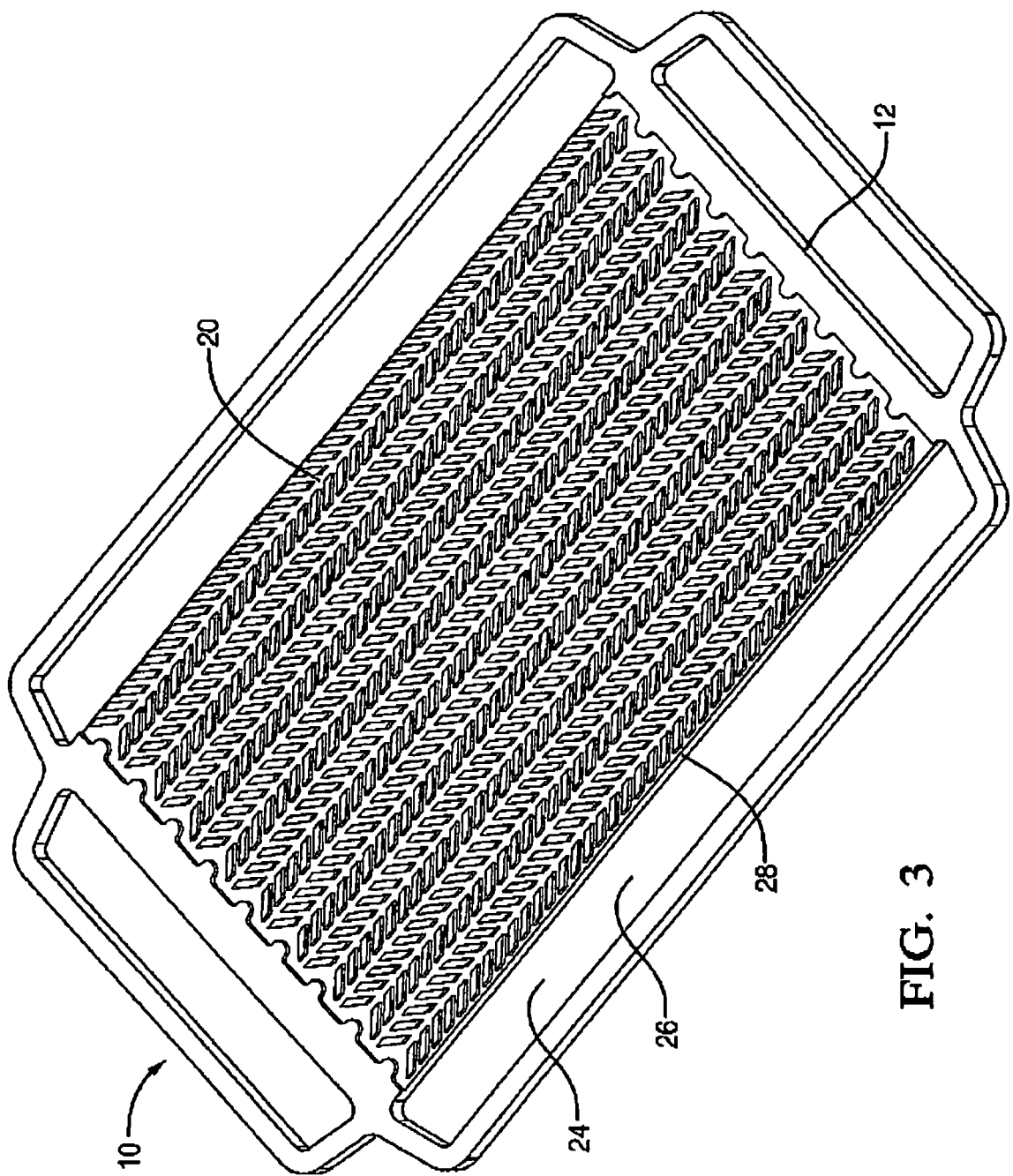
FIG. 3 is a perspective view of a cathode side of an etched interconnect in accordance with one possible embodiment of the present invention.
Figure 4:
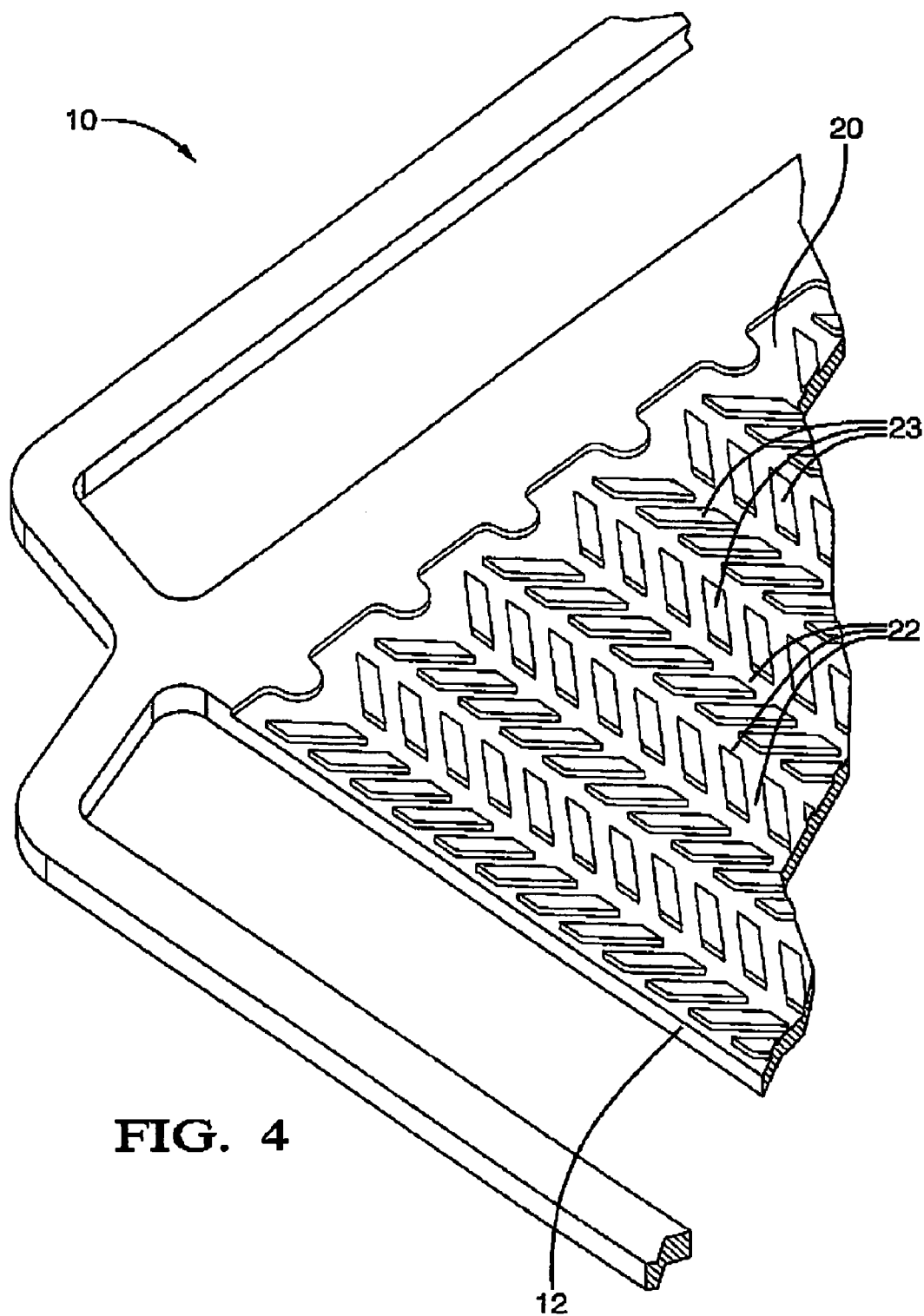
FIG. 4 is a view showing further detail of a portion of the etched interconnect of FIG. 3.

Turning to FIGS. 3 and 4, the second face 20 of the base metal sheet 12, On the side opposite the first five 14 having cathode gas flow passages 22 and standing contact surfaces 23 is shown. Most preferably, the cathode gas flow passages 22 are configured to provide deep flow passages to promote oxidant mixing and a large surface area for optimum heat transfer to the cathode gas stream. In one embodiment, for example, cathode gas flow passages 22 comprise a depth of about 1.0 millimeter. In a preferred embodiment, the cathode gas flow passages 22 have a total surface area for heat transfer of about 2 to about 4 times the projected area of the second face 20. The cathode face 20 also provides good electrical contact and a stiff, uniform structural support for the fuel cell.

Figure 5:
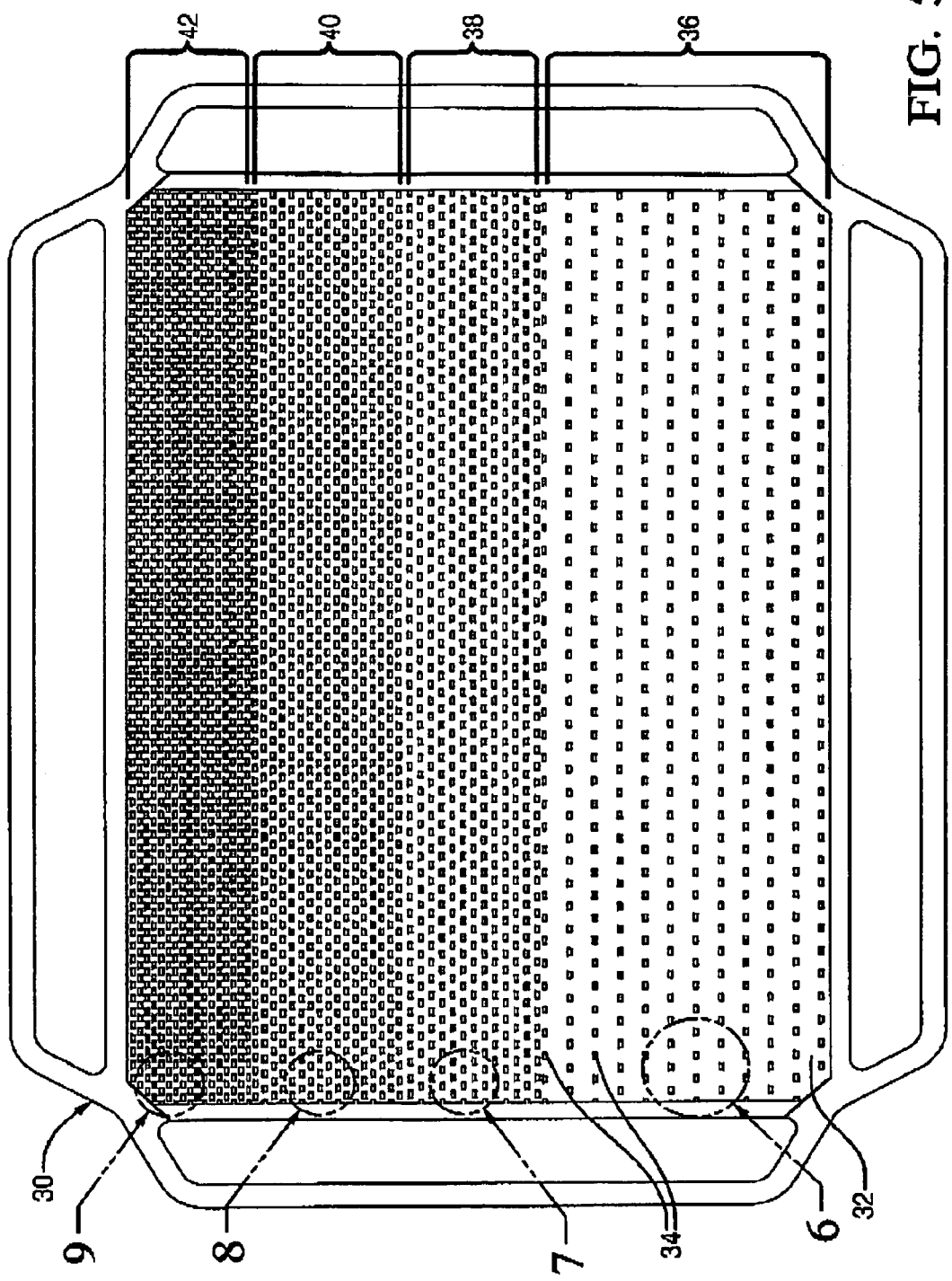
FIG. 5 is a perspective view of an alternate embodiment of an interconnect in accordance with the invention.
Figure 6:
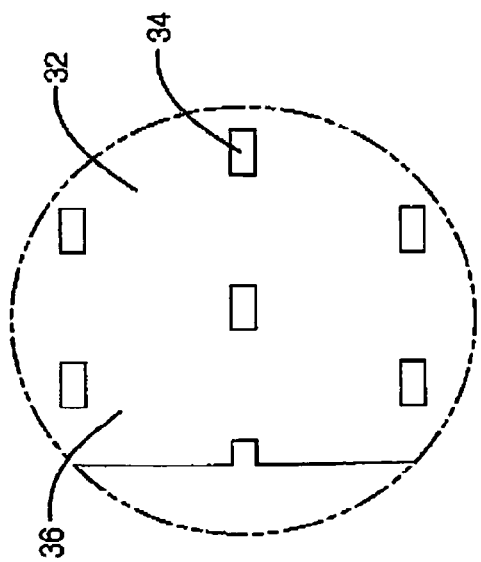
FIG. 6 is an enlarged view of a portion of a first section of FIG. 5.
Figure 8:
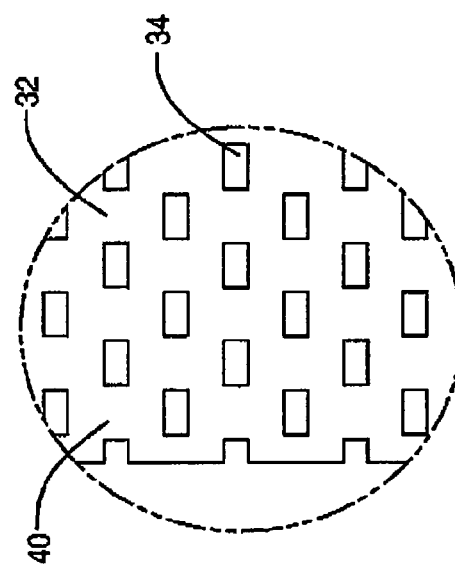
FIG. 8 is an enlarged view of a portion of a third section of FIG. 5.
Figure 7:
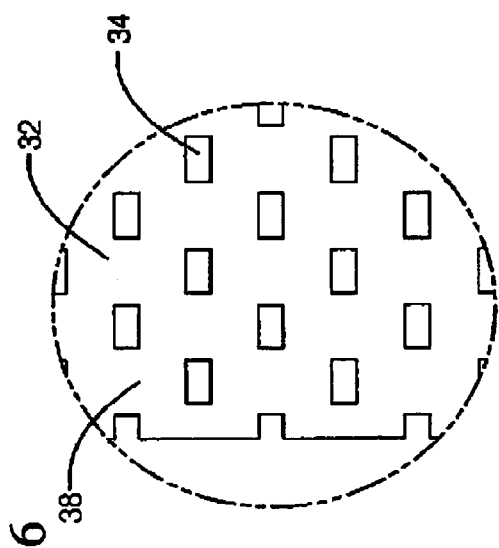
FIG. 7 is an enlarged view of a portion of a second section of FIG. 5.
Figure 9:
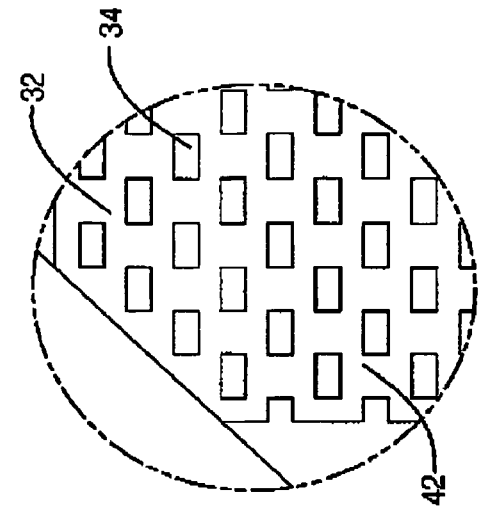
FIG. 9 is an enlarged view of a portion of a fourth section of FIG. 5.

FIGS. 5-9 illustrate an embodiment of an interconnect 30 comprising gas flow passages 32 and standing surfaces 34 providing a unique flow passage geometry of varying cross-section and width across the interconnect sufficient to effect local variations in flow direction, velocity, and turbulence. On the anode side of the fuel cell, the variations in flow direction, velocity, and turbulence are designed to affect fuel utilization across the plane of the cell as fuel concentration changes and to enhance transport of reaction products. On the cathode side of the fuel cell, the variations in flow velocity and turbulence and change in surface area are designed to affect heat transfer to the cathode air as the temperature of the cathode air varies across the plane of the fuel cell. In FIG. 5, the gas flow passages 32 and standing surfaces 34 are arranged to provide four sections across the interconnect, each section having a progressively denser disposition of standing surfaces 34. FIG. 6 provides an enlarged view of a portion of the first section 36 of FIG. 5 showing the placement of gas flow passages 32 and standing surfaces 34. FIG. 7 provides an enlarged view of a portion of the second section 38 of FIG. 5 showing the placement of gas flow passages 32 and standing surfaces 34. FIG. 8 provides an enlarged view of a portion of the third section 40 of FIG. 4 showing the placement of gas flow passages 32 and standing surfaces 34. FIG. 9 provides an enlarged view of a portion of the fourth section 42 of FIG. 5 showing the placement of gas flow passages 32 and standing surfaces 34. While the anode gas passages are illustrated, it is understood that this concept is applicable to both anode and cathode gas passage geometry.

FIGS. 10-17 illustrate yet another embodiment of an interconnect 44 having gas flow passages 46 and standing surfaces 48 arranged to provide seven sections across the interconnect, each section having a progressively denser disposition of standing surfaces 48. Further, standing surfaces 48 are disposed at varying angles to one another to further affect flow direction, velocity and turbulence. FIG. 11 provides an enlarged view of a portion of the first section 50 of FIG. 10 showing the placement of gas flow passages 46 and standing surfaces 48. FIG. 12 provides an enlarged view of a portion of the second section 52 of FIG. 10 showing the placement of gas flow passages 46 and standing surfaces 48. FIG. 13 provides an enlarged view of a portion of the third section 54 of FIG. 10 showing the placement of gas flow passages 46 and standing surfaces 48. FIG. 14 provides an enlarged view of a portion of the fourth section 56 of FIG. 10 showing the placement of gas flow passages 46 and standing surfaces 48. FIG. 15 provides an enlarged view of a portion of the fifth section 58 of FIG 10 showing the placement of gas flow passages 46 and standing surfaces 48. FIG. 16 provides an enlarged view of a portion of the sixth section 60 of FIG. 10 showing the placement of gas flow passages 46 and standing surfaces 48. FIG. 17 provides an enlarged view of a portion of the seventh section 62 of FIG. 10 showing the placement of gas flow passages 46 and standing surfaces 48.

One or more optional coating layers may be disposed upon the base metal sheet 12, if desired. Each face 14, 20 may be coated with one or more coatings prior to or subsequent to the etching process, as desired. For example, an optional conductive coating layer or layers may be provided on one or both faces 14, 20 to enhance electrical conductivity between the interconnect 10 and mating fuel cell surfaces. Further, an optional yielding layer may be disposed on one or both faces 14, 20 to enhance conformity of the interconnect 10 to the surface irregularities in the mating ceramic fuel cell. The optional conductive coating layer may comprise any suitable material providing high-temperature conductivity and chemical compatibility with the fuel cell element. Examples of suitable conductive coatings include, but are not limited to, pure nickel, silver, gold, platinum, conductive glass, intermetallics, and combinations thereof.

FIG. 18 schematically depicts a portion of a ceramic fuel cell stack 64 including ceramic fuel cells 66 having anodes 68 and cathodes 70 in relation to interconnects 10 in accordance with the invention. Interconnects 10 have disposed thereon a yielding layer 72 which geometrically conforms to the irregular surfaces on the cathode and anode thereby substantially reducing contact resistance.

In one embodiment of the present invention, an etched interconnect fuel cell stack assembly includes a gas supply comprising external stamped sheet metal manifolds secured to the outside of the fuel cell stack assembly (not shown).

In an alternate embodiment, integral gas supply manifolds 24 are provided to the fuel cell element and interconnects 10. In this embodiment, the interconnects 10 have large through passages 26 arranged along the interconnect outer perimeter 28 to form integral inlet and outlet manifolds when stacked. The interconnects 10 and ceramic fuel cell element are sized and configured so that the gas supply through passages 26 align with matching through holes in the ceramic fuel cell element. The arrangement avoids the need for gaskets between the interconnects. Optionally, the non-active portion of the fuel cell is coated with a glass adhesive to prevent oxidation of the edges of the cell.

In an alternate embodiment, the interconnects 10 are fused to the fuel cell stack. Fusing may be effected, for example, by placing the assembled fuel cell stack assembly in a brazing furnace with the stack under load, thereby flattening and fusing the fuel cells to the interconnects 10. A brazing alloy can be coated onto the interconnect or cell surfaces prior to the fusing process to enhance the bonding between the components. This embodiment is particularly advantageous for providing good gas sealing, and enhanced electrical and heat conduction. Further, the fusing device provides a strong, robust device for subsequent handling and assembly.

The embodiments of the present interconnect, although particularly advantageous for applications comprising a planar fuel cell element for use in a vehicle, can also be utilized in various other fuel cell configurations. The embodiments can further be used in numerous applications, including, but not limited to, co-generation of heat and electric power, distributed electric power generation such as small scale power plants for commercial/industrial/marine applications, and portable power generation, such as military/construction/recreational applications, among others.

The various embodiments of the present invention provide numerous advantages over the prior art. Some of the advantages of various embodiments of the present etched interconnects include, but are not limited to: (1) ease of manufacture and lower fabrication cost with a minimum number of parts; (2) robust component parts enhancing ease of assembly; (3) large heat transfer surface area; (4) low pressure drops in the fuel and oxidant gas streams; (5) shaped flow passages for generating swirl without excessive turbulence; (6) integral manifolding; (7) good electrical contact; (8) thinner interconnects providing a more compact stack assembly; (9) reduced overall mass and volume of the fuel cell assembly; (10) robust structure as assembled; and (11) enhanced fuel utilization resulting in higher power density.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of preparing an interconnect, comprising:
providing a conductive base sheet including a first face and a second face opposite the first face;
selecting a first geometric configuration for a single anode gas flow passage in the first face for fluid flow in the interconnect therethrough, said fluid flow entering and exiting the first geometric configuration at the outer perimeter of the interconnect;
preparing the single anode gas flow passage in the first face, the first face defining the first geometric configuration, and the first geometric configuration further defining a plurality of anode standing surfaces thereon, and the plurality of anode standing surfaces further defining a plurality of anode gas flow passages thereabout wherein each anode standing surface is encircled by the anode gas flow passages, and each anode standing surface including a anode surface contact area;
selecting a second geometric configuration for a single cathode gas flow passage in the second face for fluid flow in the interconnect therethrough, said fluid flow entering and exiting the second geometric configuration along the outer perimeter of the interconnect; and
preparing the single cathode gas flow passage in the second face, the second face defining the second geometric configuration, and the second geometric configuration further defining a plurality of cathode standing surfaces thereon, and the plurality of cathode standing surfaces further defining a plurality of cathode gas flow passages thereabout wherein each cathode standing surface is encircled by the cathode gas flow passages, and each cathode standing surface including a cathode surface contact area;
wherein the step of preparing said single anode gas flow passage further includes the anode standing surfaces being arranged in a plurality of parallel, spaced rows in the first geometric configuration, and the plurality of parallel rows comprise a repeating parallel row pattern including a first row of anode standing surfaces and a second row of anode standing surfaces, and the anode standing surfaces in the first row are in alignment to anode standing surfaces in the second row in a direction perpendicular to the arrangement of the plurality of parallel rows; and
wherein the steps of preparing said single anode and cathode gas flow passage region further includes the step of forming the plurality of anode and cathode gas flow passages on the respective first and second face thereon by etching.

2. The method of claim 1, wherein the step of selecting the first and second geometric configuration further includes the steps of:
providing fluid flow entering a first portion of the outer perimeter adjacent to the geometric configurations;
flowing the fluid through the respective first and second geometric configuration; and
fluid exiting the geometric configurations at the outer perimeter at a second portion different from the first portion.

3. The method of claim 1, wherein the steps of preparing said single anode and cathode gas flow passage further include the steps of:
defining a first anode standing region in the first geometric configuration having a first density of anode standing surfaces; and
defining a second anode standing region in the first geometric configuration different from the first anode standing region, said second anode standing region having a second density of anode standing surfaces;

wherein the second density is greater than the first density.

4. The method of claim 3, wherein the first anode standing region is parallel to the second anode standing region and the first anode standing region is adjacent to the a second anode standing region.

5. The method of claim 3, wherein the steps of preparing said single anode and cathode gas flow passage further include the steps of:

defining a third anode standing region in the first geometric configuration having a third density of anode standing surfaces, said third anode standing region being different from the first and the second anode standing region; and defining a fourth anode standing region in the first geometric configuration having a fourth density of anode standing surfaces, said fourth anode standing region being different from the first and second and third anode standing region;

wherein the third density is greater than the second and first density, and the fourth density is greater than the third and the second and the first density.

6. The method of claim 5, wherein the first and second and third and fourth anode standing region are parallel, and the first anode standing region being adjacent to the second anode standing region and the second anode standing region being adjacent to the third anode standing region and the third anode standing region being adjacent to the fourth anode standing region.

7. The method of claim 5, wherein the steps of preparing said single anode and cathode gas flow passage further include the steps of:

defining a fifth anode standing region in the first geometric configuration having a fifth density of anode standing surfaces, said fifth anode standing region being different from the first and second and third and fourth anode standing region;

defining a sixth anode standing region in the first geometric configuration having a sixth density of anode standing surfaces, said sixth anode standing region being different from the first and second and third and fourth and fifth anode standing region; and defining a seventh anode standing region in the first geometric configuration having a seventh density of anode standing surfaces, said seventh anode standing region being different from the first and second and third and fourth and fifth and sixth anode standing region;

wherein the fifth density is greater than the fourth and third and second and first density, and the sixth density is greater than the fifth and fourth and third and second and first density, and the seventh density is greater than the sixth and fifth and fourth and third and second and first density.

8. The method of claim 7, wherein the first and second and third and fourth and fifth and sixth and seventh anode standing region are parallel, and the first anode standing region being adjacent to the second anode standing region and the second anode standing region being adjacent to the third anode standing region and the third anode standing region being adjacent to the fourth anode standing region and the fourth anode standing region being adjacent to the fifth anode standing region and the fifth anode standing region being adjacent to the sixth anode standing region and the sixth anode standing region being adjacent to the seventh anode standing region.

9. The method of claim 1, wherein said plurality of standing surfaces have a density of about 10 to about 25 standing surfaces per square centimeter.

10. The method of claim 1, wherein said surface contact area comprises a diameter of about 0.5 to about 1 millimeter.

11. The method of claim 1, wherein said single cathode gas flow passage comprises deep flow passages having a depth of about 1.0 millimeter to promote oxidant mixing.

12. The method of claim 1, wherein said plurality of cathode gas flow passages have a surface area of about 2 to about 4 times a projected area of said second face of said conductive base sheet.

13. The method of claim 1, further comprising:

disposing a conductive coating on one or more faces of said conductive base sheet, said conductive coating selected to enhance electrical conductivity between said interconnect and mating fuel cell surfaces.

14. The method of claim 1, further comprising:

disposing a yielding layer on one or more faces of said conductive base sheet, said yielding layer selected to enhance conformity of said interconnect to surface irregularities in mating fuel cell surfaces.

15. The method of claim 1, further comprising:

preparing through passages arranged along an outer perimeter of said interconnect to form an integral inlet and an integral outlet manifold.

16. The method of claim 1, wherein the step of forming the anode and cathode gas flow passages by etching further includes the etching comprising at least one of photochemical etching and electrochemical etching and cutting and laser cutting and a combination thereof.

17. The method of claim 1, wherein the steps of preparing said single anode and cathode gas flow passage further includes the first surface contact area having a first shape and the second surface contact area having a second shape, and each anode standing surface comprising columnar form corresponding to the first shape, and each cathode standing surface comprising columnar form corresponding to the second shape.

18. The method of claim 17, wherein the first shape is different than the second shape.

19. The method of claim 18, wherein the first shape is circular and the columnar form of each anode standing surface is cylindrical, and the second shape is a noncircular and the columnar form of each cathode standing surface is noncylindrical.

20. The method of claim 19, wherein said second noncircular shape is trapezoidal and the columnar form of each cathode standing surfaces is trapezoidal.

21. The method of claim 1, wherein the step of preparing said single anode gas flow passage region further includes the plurality of anode standing surfaces being arranged in a plurality of parallel, spaced rows in the first geometric configuration, and the plurality of parallel rows comprise a repeating parallel row pattern including a first row of anode standing surfaces and a second row of anode standing surfaces, and the anode standing surfaces in the first row are offset from anode standing surfaces in the second row whereby the anode standing surfaces in the first row are not in alignment to anode standing surfaces in the second row in a direction perpendicular to the arrangement of the plurality of parallel rows.

22. The method of claim 1, wherein the step of preparing said single cathode gas flow passage region further includes the plurality of cathode standing surfaces being arranged in a plurality of parallel, spaced rows in the second geometric configuration, and the plurality of parallel rows comprising a repeating parallel row pattern including a first row of cathode standing surfaces and a second row of cathode standing surfaces, and each cathode standing surface in the first row opposing a corresponding cathode standing surface in the second row, and the cathode standing surfaces in the first row being angularly offset in a first direction from a disposition direction of the first and second row, and the cathode standing surfaces in the second row being angularly offset in a second direction opposite the first direction from a disposition direction of the first and second row.

23. The method of claim 1, wherein the steps of selecting the first and second geometric configuration further include the first geometric configuration being defined in a majority portion of the first face and the second geometric configuration being defined in a majority portion of the second face.

24. The method of claim 1, wherein the steps of selecting the first and second geometric configuration further include the first and second geometric configuration comprising polygonal shape.

25. The method of claim 24, wherein the polygonal shape comprises rectangular shape, and the rectangular shape comprising a respective area about equal to the first face and a respective area about equal to the second face.

* * * * *